Sept. 15, 1936.　　　W. J. HOZA　　　2,054,600
TRIPOD
Filed Oct. 9, 1934
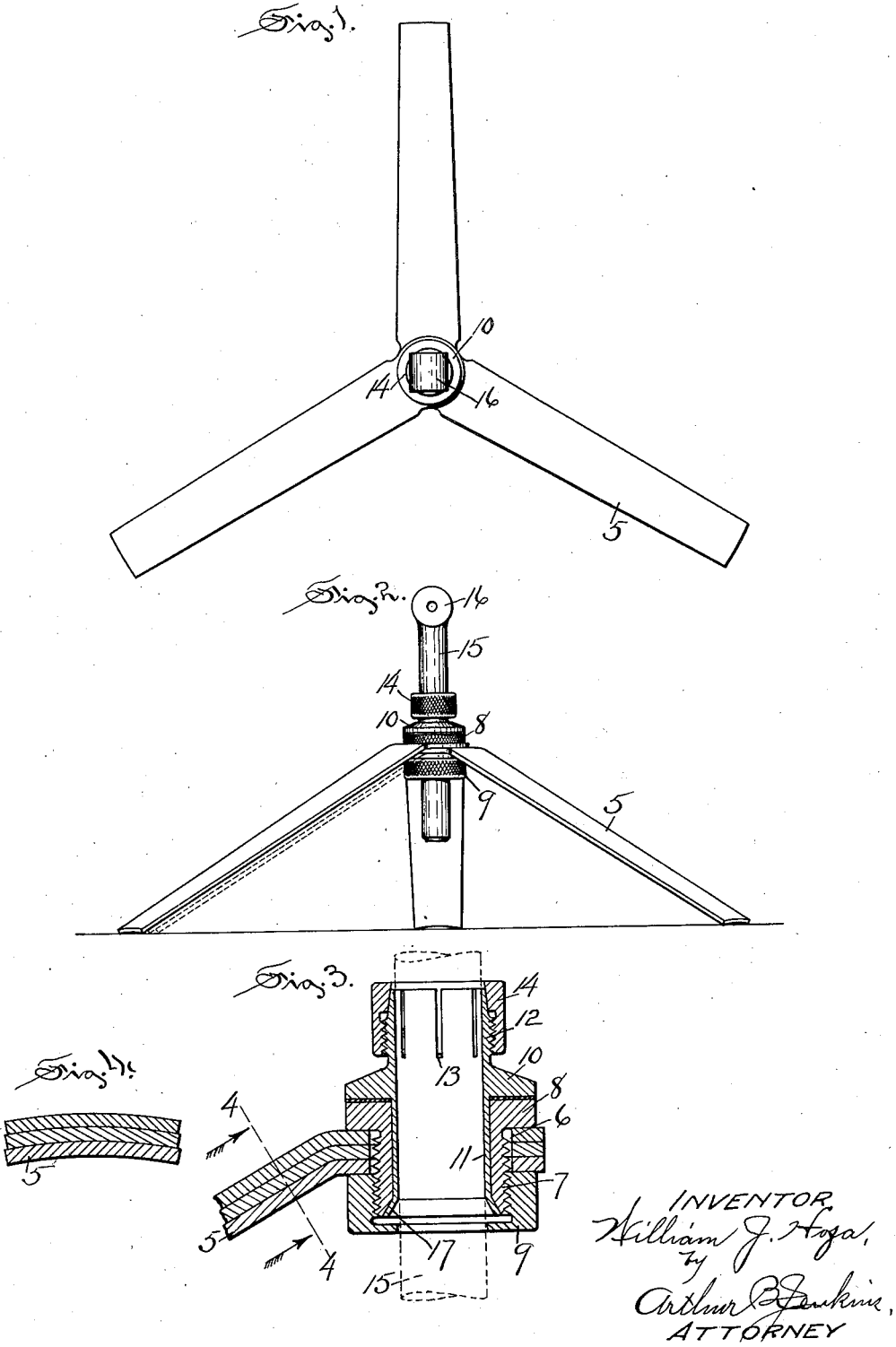
INVENTOR,
William J. Hoza,
by
Arthur B. Jenkins,
ATTORNEY Patented Sept. 15, 1936

2,054,600

UNITED STATES PATENT OFFICE 2,054,600

TRIPOD

William J. Hoza, Hartford, Conn.

Application October 9, 1934, Serial No. 747,575

4 Claims. (Cl. 248—167)

My invention relates to the class of devices employed for supporting telescopes, cameras, or other similar devices, and an object of my invention, among others, is the production of a tripod that is simple in construction, that may be folded into compact form, and that will afford a rigid support for the instrument mounted thereon.

One form of a device embodying my invention and in the construction and use of which the objects herein set out, as well as others, may be attained is illustrated in the accompanying drawing, in which—

Figure 1 is a top view of my improved tripod.

Figure 2 is a side view of the same.

Figure 3 is a detail view on enlarged scale through the supporting head.

Figure 4 is a detail view in section on a plane denoted by the dotted line 4—4 of Fig. 3.

In the accompanying drawing the numeral 5 denotes the legs of my improved tripod which, as shown in Figure 4, are curved in cross section so that they will nest one within another. These legs are bent at their upper ends at an angle to the main portion and each leg has a hole 6 as a means for attachment of a supporting head to which the telescope or similar instrument is fastened.

This head comprises a clamp body including a threaded stem 7 and a flange 8 at one end. The stem 7 is inserted through the holes in the legs and a clamp nut 9 fitting the threaded stem is employed to secure the legs in place.

A chuck embodies a base 10 which is seated on the flange 8, said chuck also including a sleeve 11 rotatably fitting a hole through the stem 7 and flange 8, and as shown in Fig. 3 of the drawing. A neck 12 rises from the base 10 said neck being slitted as at 13 from its end inwardly, and the outer end of the neck is beveled to receive the beveled surface of the wall of a hole in a clamp nut 14 which is threaded to engage a threaded portion of the neck 12. The hole through the sleeve 11 and the neck 12 is formed to receive a post 15 which extends through said neck and sleeve and said post may have an eye 16 or other suitable means for attachment of a telescope, a camera, or other device. In order to retain the sleeve 11 in place it is provided with a beveled flange 17 at its lower end which fits the beveled lower edge of the hole through the stem 7.

When the tripod is not in use, to close the legs together the clamp nut 9 may be loosened, the legs 5 may be then swung into the position shown in Fig. 3 and the nut 9 then being tightened as shown in said figure the legs will be secured closely in nested relation as shown in Figure 3 and in dotted lines in Figure 2, and likewise the clamp nut 14 being loosened the post 15 may be slid inwardly so that the eye only will project beyond the head, thereby comprising a very compact arrangement for the device as a whole.

In accordance with the provisions of the patent statutes I have described the principles of operation of my invention together with the device which I now consider to represent the best embodiment thereof; but I desire to have it understood that the device shown is only illustrative and that the invention may be carried out by other means and applied to uses other than those above set out.

I claim:

1. A tripod including a head comprising a flange at one end and a rigid, hollow threaded stem projecting therefrom, means on said head for attachment of a device to be supported in said stem, a set of legs of curved shape in cross section and of even length to nest one within another thereby to prevent lateral separation when secured in such nested relation, said legs having holes at their upper ends through which said stem projects, and a clamping nut engaged with said threaded stem to secure said legs in place.

2. A tripod including a head having a flange and a threaded stem a support including a base seated upon said flange, and means for securing said base to said head, a set of legs having their ends bent at an angle to the main portion thereof, said legs being curved in cross section to fit and nest one within another, and said bent portion having a hole to receive said threaded stem, and a nut engaged with said threaded stem to clamp said legs in locked position against relative lateral movement.

3. A tripod including a head comprising a flange and a threaded stem, legs swivelly attached to said stem, a nut for clamping said legs in place, a support including a base seated upon said flange and also including a sleeve projecting within said flange and stem, and means for securing to said support a device to be mounted thereon.

4. A tripod including a head comprising a stem and a flange, legs swivelly attached to said stem, a support including a base seated upon said flange and a sleeve projecting into said stem, means for preventing lengthwise movement of said sleeve in said stem, a neck projecting from said base and slitted at its outer end, said neck being beveled, and a nut fitting a threaded portion of said neck and having a beveled surface to cooperate with the beveled surface on the neck to clamp a post thereto.

WILLIAM J. HOZA.